United States Patent [19]

Rioux

[11] Patent Number: 5,018,854
[45] Date of Patent: May 28, 1991

[54] THREE DIMENSIONAL IMAGING DEVICE

[75] Inventor: Marc Rioux, Ottawa, Canada

[73] Assignee: National Research Council of Canada, Ottawa, Canada

[21] Appl. No.: 506,792

[22] Filed: Apr. 10, 1990

[30] Foreign Application Priority Data

Apr. 17, 1989 [CA] Canada ................................. 596910

[51] Int. Cl.$^5$ ............................................. G01B 11/24
[52] U.S. Cl. ..................................... 356/376; 356/375
[58] Field of Search .............................. 356/375, 376; 250/201.2, 201.4, 201.8

[56] References Cited

U.S. PATENT DOCUMENTS

| 4,645,347 | 2/1987 | Rioux | 356/376 |
| 4,828,390 | 5/1989 | Miyoshi | 356/375 |

FOREIGN PATENT DOCUMENTS 824107  4/1981  U.S.S.R. .............................. 356/375

Primary Examiner—F. L. Evans

[57] ABSTRACT

A three dimensional imaging device has a converging lens system defining an optical axis extending in a direction Z, and a color sensitive position sensitive detector having a series of pixels extending in at least one of two mutually perpendicular directions X and Y both perpendicular to the direction Z. The lens system serves to simultaneously image a plurality of distributed points on a target surface onto the detector to generate first data on the coordinate of each point in at least a selected one, and preferably both, of the directions X and Y. A mask with a pair of differently colored filters, e.g. red and blue, spaced apart from each other in the selected direction is mounted in the lens system for forming a pair of discrete images on the detector of each point, such images being formed each in a respective color. The result is to generate, by means of measurement of the spacing between the images, second data on the coordinate of each point in the direction Z. The first and second data can then be extracted for all the points by scanning the pixels.

6 Claims, 2 Drawing Sheets

THREE DIMENSIONAL IMAGING DEVICE

BACKGROUND OF THE INVENTION

The present invention relates to a three dimensional imaging device, that is to say a device for obtaining three dimensional data of a target surface, whether such data is displayed in three dimensional form or not. Indeed, the data may never be displayed as such, but may merely be used to control other equipment. Such an imaging device is useful for supplying three dimensional data to other instruments. For example, such data is valuable in the science of robotics, where objects are required to be identified on the basis of their three dimensional shape, and to be manipulated accordingly. Such data is also useful in monitoring the accuracy of the shape of a series of articles intended to be identical with each other. A three dimensional imaging device of this type is inexpensive to manufacture, high speed in operation, compact, and robust, and hence especially well adapted for use in robotics, e.g. for mounting on the end of a robot arm, although the utility of the present invention is by no means limited to robotics.

Such imaging devices are disclosed in my earlier U.S. Pat. No. 4,645,347 issued Feb. 24, 1987 (the contents of which are incorporated herein by reference) and the equivalent Canadian patent application Ser. No. 505,166 filed Mar. 26, 1986.

More specifically, my prior patent discloses an imaging device that has a converging lens system defining an optical axis, i.e. direction Z, together with a position sensitive light detector that has a series of pixels extending in at least one direction X perpendicular to such Z direction. The detector is preferably bidimensional, i.e. has an array of pixels extending in mutually perpendicular directions, X and Y, both perpendicular to the Z direction.

The lens system serves to simultaneously image a plurality of distributed points on a target surface onto the detector, whereby to generate first data on the coordinate of each such point in the X direction, and, when the detector is bidimensional, also in the Y direction.

The system also employs a mask having a pair of apertures spaced apart from each other in the X direction for forming discrete images on the detector of each of the points. By virtue of the spacing between such images, they provide second data on the coordinate of each point in the Z direction. A computer scans the pixels to extract the first and second data for all the points and is hence able to determine the X, Y and Z coordinates of each point.

One of the limitations of this prior system is its inability to work accurately at or near focus, i.e. with values of the Z coordinate close to zero.

Another of the limitations of this system is that, in order to avoid sign ambiguity, i.e. to distinguish between positive and negative values of a Z coordinate, it is necessary to apply a bias (using a biprism or axicon lens), as explained in connection with FIG. 4 of the prior patent.

SUMMARY OF THE INVENTION

An object of the present invention is to achieve an improved depth of view, and, in particular, an ability to function effectively with values of the Z coordinate at or near zero.

Another object of the present invention is to modify the prior imaging device described above in such a manner as to enable negative values of the Z coordinate to be readily distinguished from positive values without the need for an addition biasing lens.

To these ends, the invention consists of an imaging device having a converging lens system defining an optical axis extending in a direction Z, and a color sensitive position sensitive detector having a series of pixels extending in at least one of the two mutually perpendicular directions X and Y perpendicular to direction Z, such lens system serving to simultaneously image a plurality of distributed points on a target surface onto the detector to generate first data on the coordinate of each point in at least a selected one of the directions X and Y, preferably both. An otherwise opaque mask with a pair of differently colored filters spaced apart from each other in the selected direction is included in the lens system for forming discrete images on the detector of each of the points in a respective color. The result is to generate, by means of the spacing between such images, second data on the coordinate of each point in the direction Z. Scanning of the pixels extracts such first and second data for all the points.

BRIEF DESCRIPTION OF THE DRAWINGS

An embodiment of the invention is illustrated by way of example in the accompanying drawings, in which.

DESCRIPTION OF THE PREFERRED EMBODIMENT

Figure 1:
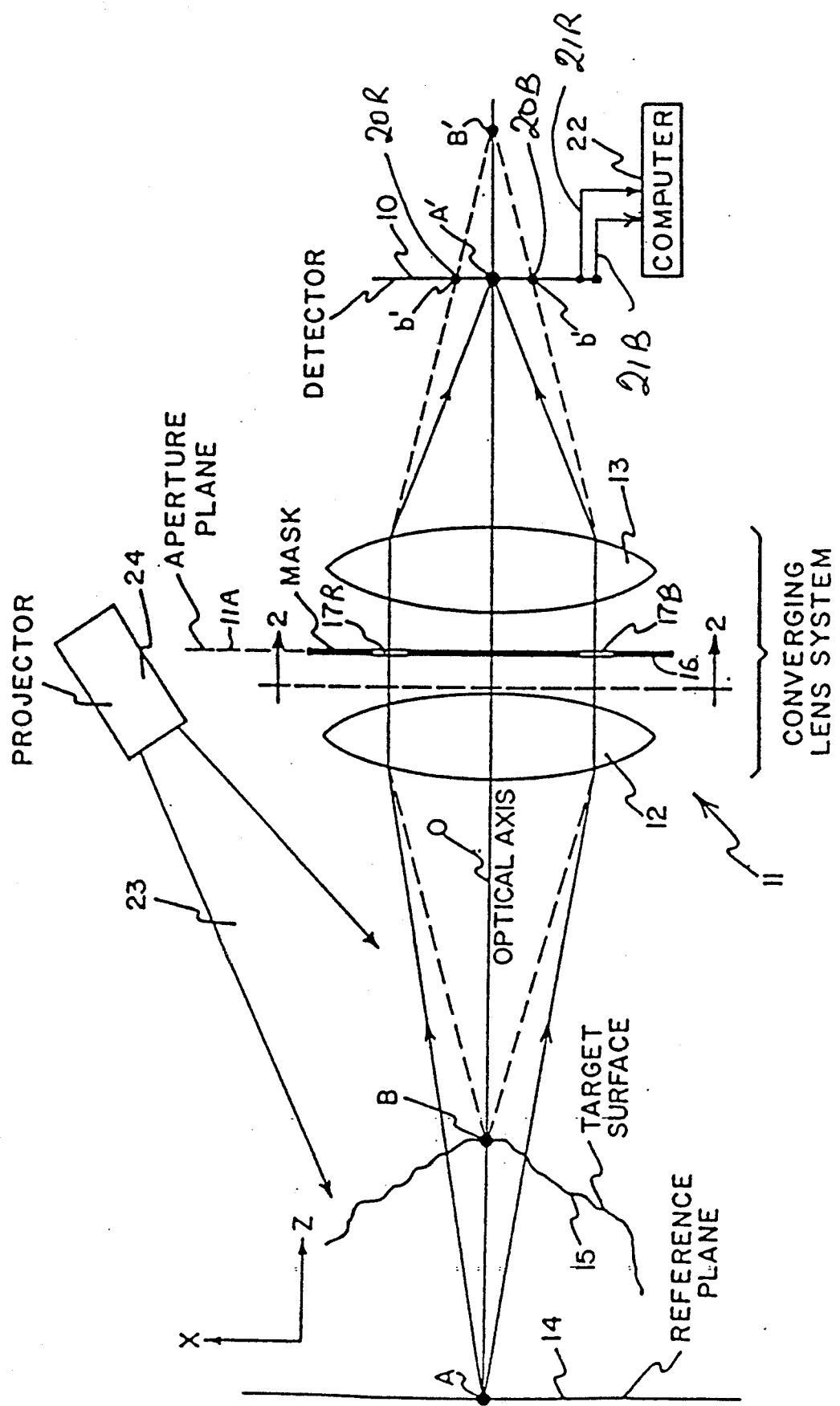
FIG. 1 shows the basic elements of an imaging device according to the embodiment.

FIG. 1 shows a bidimensional, color sensitive, CCD detector 10 of the type commonly employed in television cameras. A converging lens system 11 is assumed to consist of two lenses 12 and 13. In reality, especially since a wide angle lens will normally be preferred, each of the lenses 12 and 13 will itself consist of a group of lenses. Reference numeral 14 designates a reference plane and 15 is an object under study, i.e. the target surface. The converging lens system 11 will focus a point A at the intersection of the reference plane 14 and the optical axis 0 at a point A' on the detector 10. However, a point B on the surface of the object 15 on the axis 0 and having a positive Z coordinate, will theoretically be focussed at a point B' beyond the detector 10. In practice, the image of the point B will appear as a large, unfocussed, circular area on the detector 10 between points b'.

However, a mask 16 is associated with the lens system and is preferably located in, or as near as practicable to, the aperture plane 11A of the lens system, i.e. the plane in which vignetting is a minimum. In practice, a typical camera lens system with a normal adjustable aperture will be used, in which case the mask will preferably be located in close proximity to this aperture.

In my prior patent referred to above, this mask and a pair of circular apertures through which light could pass, the remainder of the mask being opaque.

Figure 2:
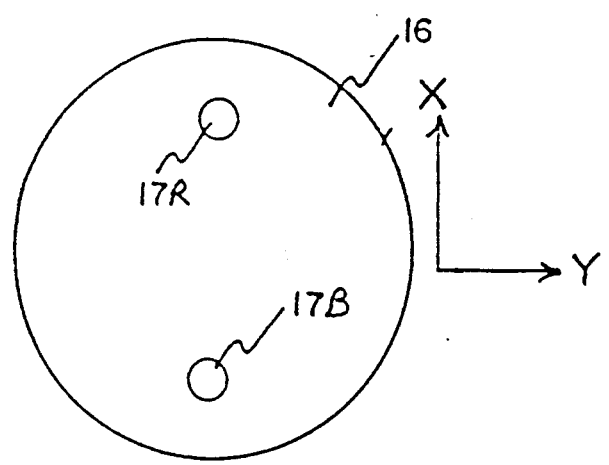
FIG. 2 is a section on 2—2 in FIG. 1.

According to the present invention, while the bulk of the mask 16 remains opaque, the apertures are replaced by a pair of different color filters 17R and 17B (see also FIG. 2), which can, for example, be red and blue filters, respectively. The effect of the use of the mask with the filters 17R and 17B is to cause the detector 10 to receive at the points b' two small discrete dots or images 20R and 20B of the target point B, the dot 20R being red and the dot 20B being blue. Note that the filters 17R and 17B are spaced apart in the X direction.

The detector 10 embodies the usual filters employed in a color camera, whereby scanning of the pixels of the detector generates a pair of outputs 21R (for red data) and 21B (for blue data) these outputs being passed to a computer 22. The spectral transmission of the filters 17R and 17B matches the color sensitive elements of the camera.

The distance between the two dots 20R and 20B is a function of the distance of the point B from the reference plane 14 in the Z direction. The detector 10 thus has the needed information of the Z coordinate of each point within its field of view in the X and Y directions. The spacing between the points 20R and 20B, as measured by the computer 22, thus represents the Z coordinate for each point B, i.e. constitutes the so-called "second data" referred to above, while the center point between these points 20R and 20B represents the X and Y coordinates for the point B, the so-called "first data" referred to above. The scan lines of the detector 10 will be oriented parallel to the line between the two filters 17R and 17B, i.e. in the X direction.

Various method for the processing of such data are known. Such processing is substantially simplified in the present invention by the fact that the computer 22 receives two input signals (a stereo pair) that can be readily compared. This avoids the need for the correlation of a single signal with itself (autocorrelation), as was necessary in my prior system, and which gave rise to the difficulties of working satisfactorily at or near focus, as well as to the sign ambiguity if no biasing lens were used.

While the imaging device described can function with ambient light, provided the target surface has sufficient texture, in most circumstances it is preferred to illuminate the object 15 with light 23 from a projector 24. The light 23 can be ordinary white light, or it can be from a white light laser. Alternatively, a two-color laser can be used. The light can either be unstructured or structured. An example of the latter is to arrange for the projector 24 to illuminate the object with a multi-strip pattern.

If the projector 24 comprises a pulsed laser, the device is capable of freezing a relatively fast moving object for study.

Colors other than red and blue can, of course, be chosen for the filters, provided the detector is correspondingly equipped to distinguish the chosen colors.

What is claimed is:

1. An imaging device having a converging lens system defining an optical axis extending in a direction Z, and a color sensitive position sensitive detector having a series of pixels extending in at least one of two mutually perpendicular directions X and Y both perpendicular to said direction Z, said lens system serving to simultaneously image a plurality of distributed points on a target surface onto the detector to generate first data on the coordinate of each said point in at least a selected one of the directions X and Y; a mask having a pair of differently colored filters spaced apart from each other in said selected direction for forming discrete images on the detector of each said point in a respective color, whereby to generate, by means of the spacing between said images, second data on the coordinate of each said point in the direction Z; and means for scanning said pixels to extract said first and second data for all said points.

2. The device of claim 1, wherein the mask is located substantially in the aperture plane of the lens system.

3. The device of claim 1, wherein said filters are symmetrically located on opposite sides of the optical axis and are each circular in shape.

4. The device of claim 1, including means for illuminating the target surface.

5. The device of claim 1, wherein said illuminating means projects a structured pattern of light onto the target surface.

6. The device of claim 1, wherein said position sensitive detector is bidimensional having an array of pixels extending in both said X and Y directions.

* * * * *